(12) United States Patent
Kim

(10) Patent No.: US 10,034,060 B2
(45) Date of Patent: Jul. 24, 2018

(54) DISPLAY APPARATUS AND CONTROL METHOD THEREOF

(71) Applicant: SAMSUNG ELECTRONICS CO., LTD., Suwon-si (KR)

(72) Inventor: Wan-su Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 14/228,596

(22) Filed: Mar. 28, 2014

(65) Prior Publication Data

US 2014/0298384 A1 Oct. 2, 2014

(30) Foreign Application Priority Data

Mar. 29, 2013 (KR) .................. 10-2013-0034200
Aug. 22, 2013 (KR) .................. 10-2013-0099657
Feb. 27, 2014 (KR) .................. 10-2014-0023258

(51) Int. Cl.
*H04N 21/258* (2011.01)
*H04N 21/278* (2011.01)
(Continued)

(52) U.S. Cl.
CPC ..... *H04N 21/6547* (2013.01); *H04N 5/44513* (2013.01); *H04N 5/50* (2013.01);
(Continued)

(58) Field of Classification Search
CPC .......... H04N 21/25841; H04N 21/278; H04N 21/4524; H04N 21/462–21/4627
See application file for complete search history.

(56) References Cited

U.S. PATENT DOCUMENTS 6,233,734 B1 * 5/2001 Macrae .............. H04N 5/44543
348/E5.002
7,043,691 B1 5/2006 Kwon et al.
(Continued)

FOREIGN PATENT DOCUMENTS

CN 102566889 A 7/2012
EP 2 442 560 A1 4/2012
(Continued)

OTHER PUBLICATIONS

Communication dated Jan. 23, 2015 by the United States Patent and Trademark Office in U.S. Appl. No. 14/170,891.
(Continued)

*Primary Examiner* — Ricky Chin
(74) *Attorney, Agent, or Firm* — Sughrue Mion, PLLC

(57) ABSTRACT

A display apparatus is provided. The display apparatus includes: a display unit; a signal processor which is configured to process an image signal to be displayed as an image on the display unit; a communicator which is configured to communicate with an external network; and a controller which is configured to perform an initial setup service to provide a user with a plurality of setup stages for adjusting a plurality of functions of the display apparatus, deduce an installation region of the display apparatus based on network information when the network information for the communicator to communicate with the external network is setup in execution of the initial setup service, and automatically perform at least part of the setup stages based on information on the deduced installation region.

20 Claims, 19 Drawing Sheets

(51) Int. Cl.
  *H04N 21/45* (2011.01)
  *H04N 21/462* (2011.01)
  *H04N 21/6547* (2011.01)
  *H04N 5/445* (2011.01)
  *H04N 5/50* (2006.01)
  *H04N 21/443* (2011.01)
  *H04N 21/643* (2011.01)

(52) U.S. Cl.
  CPC ..... *H04N 21/25841* (2013.01); *H04N 21/278* (2013.01); *H04N 21/4432* (2013.01); *H04N 21/4524* (2013.01); *H04N 21/64322* (2013.01); *H04N 2005/44539* (2013.01)

(56) References Cited

U.S. PATENT DOCUMENTS

| | | | |
|---|---|---|---|
| 7,305,245 | B2 | 12/2007 | Alizadeh-Shabdiz et al. |
| 7,471,954 | B2 | 12/2008 | Brachet et al. |
| 7,474,897 | B2 | 1/2009 | Morgan et al. |
| 7,515,578 | B2 | 4/2009 | Alizadeh-Shabdiz et al. |
| 8,299,928 | B2 | 10/2012 | Kennedy |
| 8,683,071 | B2 | 3/2014 | Yue et al. |
| 8,896,764 | B2 | 11/2014 | Hardacker et al. |
| 2003/0011467 | A1* | 1/2003 | Suomela ............ G08C 17/02 340/7.1 |
| 2003/0110490 | A1 | 6/2003 | Dew et al. |
| 2004/0003345 | A1* | 1/2004 | Brown ............ G06F 17/30899 715/205 |
| 2006/0153172 | A1* | 7/2006 | Yamada ............ H04W 64/00 370/352 |
| 2006/0212479 | A1 | 9/2006 | Habas et al. |
| 2007/0150516 | A1* | 6/2007 | Morgan ............ G06F 17/30241 |
| 2007/0234381 | A1 | 10/2007 | Ishikawa |
| 2008/0098452 | A1 | 4/2008 | Hardacker et al. |
| 2008/0120682 | A1 | 5/2008 | Hardacker |
| 2008/0216142 | A1* | 9/2008 | Goldberg ........... H04N 7/17318 725/115 |
| 2008/0229370 | A1 | 9/2008 | Zustak et al. |
| 2008/0252785 | A1 | 10/2008 | Hardacker |
| 2009/0061870 | A1* | 3/2009 | Finkelstein ........... H04W 48/20 455/435.2 |
| 2009/0109897 | A1* | 4/2009 | Woo ................... H04L 41/0806 370/328 |
| 2010/0245134 | A1* | 9/2010 | Black ................... G06F 3/0219 341/23 |
| 2011/0126231 | A1 | 5/2011 | Ko |
| 2011/0283323 | A1* | 11/2011 | Ramsdell ............... H04H 60/43 725/50 |
| 2012/0096363 | A1* | 4/2012 | Barnes ............... G06Q 30/0262 715/736 |
| 2013/0024901 | A1* | 1/2013 | Sharif-Ahmadi . G06F 17/30017 725/114 |
| 2013/0031001 | A1 | 1/2013 | Frechette et al. |
| 2013/0330088 | A1* | 12/2013 | Oshima ................. H04B 10/11 398/130 |
| 2014/0092775 | A1* | 4/2014 | Goldman ............... H04W 4/021 370/254 |
| 2014/0188804 | A1* | 7/2014 | Gokhale ............ G06F 21/6218 707/645 |
| 2014/0215582 | A1* | 7/2014 | Lin ....................... H04L 63/083 726/5 |
| 2014/0241267 | A1* | 8/2014 | Cherian ................ H04L 61/103 370/329 |
| 2014/0244198 | A1* | 8/2014 | Mayer .................... G01D 18/00 702/104 |
| 2014/0269546 | A1* | 9/2014 | Rolfe .................... H04W 48/16 370/329 |
| 2014/0295767 | A1* | 10/2014 | Iijima ...................... G01T 7/00 455/41.3 |
| 2014/0323086 | A1* | 10/2014 | Wheeler ............. H04W 72/048 455/411 |

FOREIGN PATENT DOCUMENTS

| | | |
|---|---|---|
| JP | 2002-064769 A | 2/2002 |
| JP | 2003-23577 A | 1/2003 |
| WO | 2011161582 A1 | 12/2011 |

OTHER PUBLICATIONS

Communication dated Jul. 24, 2014 issued by the International Searching Authority in counterpart International Patent Application No. PCT/KR2014/002378.

Communication dated Sep. 14, 2016 issued by the European Patent Office in counterpart European Patent Application No. 14772874.5.

Communication dated Jun. 4, 2018 issued by the State Intellectual Property Office of P.R. China in counterpart Chinese Patent Application No. 201410123742.3.

* cited by examiner

DISPLAY APPARATUS AND CONTROL METHOD THEREOF

CROSS-REFERENCE TO RELATED APPLICATIONS

This application claims priority from Korean Patent Application No. 10-2013-0034200 filed on Mar. 29, 2013, Korean Patent Application No. 10-2013-0099657 filed on Aug. 22, 2013 and Korean Patent Application No. 10-2014-0023258 filed on Feb. 27, 2014, in the Korean Intellectual Property Office, the disclosures of which are incorporated herein by reference in their entirety.

BACKGROUND

Field

Apparatuses consistent with the exemplary embodiments relate to a display apparatus processing an image signal input from the outside to display an image and a control method thereof, more particularly to a display apparatus having an improved user-convenient structure that does not involve input of all settings in full in conducting an initial setup of the display apparatus to provide an optimized service to a user.

Description of the Related Art

A display apparatus processes an image signal input from an external image source to display an image on a display panel configured as various types, for example, a liquid crystal display (LCD) panel. A display apparatus available to ordinary users is provided as a TV or monitor. For example, a display apparatus configured as a TV conducts diverse processes, for example, tuning and decoding, on broadcast signals transmitted from a broadcasting station to display images of user-desired broadcast channels, or processes image signals received from content providers connected locally or via a network to display content images.

The same models of display apparatuses may be used by users in different environments. Thus, a display apparatus provides an initial setup service so that a user first sets up functions of the display apparatus appropriately for each environment to first use the display apparatus after purchase. The initial setup service includes a stage setting input method via a user interface (UI) image, and the display apparatus first sets up various functions of the display apparatus via setting input through the UI image.

However, the more functions the display apparatus can perform with technological advancement, the greater number of stages a user endures during an initial setup and the more UI images are needed for the stages, causing user inconvenience in the initial setup and increasing the required time for the initial setup.

SUMMARY

The foregoing and/or other aspects may be achieved by providing a display apparatus including: a display unit; a signal processor which is configured to process an image signal to be displayed as an image on the display unit; a communicator which is configured to communicate with an external network; and a controller which is configured to perform an initial setup service, provide a user with a plurality of setup stages for adjusting a plurality of functions of the display apparatus, deduce an installation region of the display apparatus based on network information when the network information for the communicator to communicate with the external network is setup in execution of the initial setup service, and automatically perform at least part of the setup stages based on information on the deduced installation region.

The controller may skip the automatically performed setup stages without presenting at least one of the setup stages to the user during the execution of the initial setup service.

The controller may execute the initial setup service when the user turns on the display apparatus for a first time.

The communicator may be connected to the external network for communication based on a wireless communication protocol, and the controller determines the installation region of the display apparatus based on the network information on the network based on the wireless communication protocol established for the communicator to be connected to the external network.

The controller may determine and store the installation region of the display apparatus and information on a content service provider in the region, from the network information, and may be provided with a recommended service corresponding to the determined region from the content service provider to be displayed as an image on the display unit.

The controller may display a setup image enabling the user to input the information on the installation region and the information on the content service provider when the communicator is not connected to the external network, and store the information input through the setup image.

The network information may include setup information on the communicator for Wi-Fi based connection.

The controller may determine the installation region based on Wi-Fi positioning system (WPS) information of the network information, and may determine the content service provider based on at least one from among a received signal strength indication (RSSI), wireless Internet service providers (WISP) and a service set identifier (SSID).

The controller may acquire and store a channel map corresponding to the installation region of the display apparatus and may skip a stage of scanning a broadcast signal to generate the channel map among the setup stages.

The communicator may communicate with a server in which data of the channel map corresponding to each region is already stored, and the controller may transmit the information on the installation region of the display apparatus to the server to receive the channel map corresponding to the installation region from the server.

The communicator may communicate with a server that stores region information corresponding to the network information, and the controller may determine the installation region of the display apparatus by transmitting the network information to the server and receiving the region information corresponding to the network information from the server.

If it is determined that the region information is acquired while a user interface (UI) image is being displayed to allow a user to input the installation region of the display apparatus at an initial setup service, the controller may display on the UI image a popup image to allow the user to select whether the region information is correct.

The controller may display one or more content service providers to be selectable, where the one or more content service providers correspond to the region information on the UI image upon a condition that a user selects via the popup image that the region information is correct, and displays an image to allow the user to input new region information if the user selects via the popup image that the region information is not correct.

According to yet another exemplary embodiment, there is provided a control method of a display apparatus. The method comprises: communicating with a network; performing an initial setup service; providing a user with a plurality of setup stages for adjusting a plurality of functions of the display apparatus; automatically performing at least part of the setup stages based on information on an installation region; communicating with a server that stores region information corresponding to network information; determining the installation region of the display apparatus by transmitting the network information to the server; and receiving the region information corresponding to the network information from the server.

The server may store the region information in a database. The region information may correspond to one from among an IP address and access point information.

According to yet another exemplary embodiment, there is provided a control method of a display apparatus. The method comprises: communicating with a network; performing an initial setup service; providing a user with a plurality of setup stages for adjusting a plurality of functions of the display apparatus; automatically performing at least part of the setup stages based on information on an installation region; and on a condition that it is determined that the region information is acquired while a user interface (UI) image is being displayed to allow a user to input the installation region of the display apparatus at the initial setup service, displaying on the UI image a pop-up image to allow the user to select whether the region information is correct.

The foregoing and/or other aspects may be achieved by providing a control method of a display apparatus, the method including: starting an initial setup service and providing a user with a plurality of setup stages for adjusting a plurality of functions of the display apparatus; deducing an installation region of the display apparatus based on network information when the network information for the display apparatus to communicate with an external network is setup; and automatically performing at least part of the setup stages based on information on the deduced installation region.

The automatically performing at least part of the setup stages may include skipping the automatically performed setup stages without at least one of the setup stages to the user during execution of the initial setup service.

The starting the initial setup service may include executing the initial setup service when the user turns on the display apparatus for the first time.

The display apparatus may be connected to the external network for communication based on a wireless communication protocol, and the deducing the installation region of the display apparatus may include determining the installation region of the display apparatus based on the network information on the network based on the wireless communication protocol established for the display apparatus to be connected to the external network.

The determining the installation region of the display apparatus may include determining and storing the installation region of the display apparatus and information on a content service provider in the region from the network information, and receiving a recommended service corresponding to the determined region from the content service provider and displaying as an image.

The control method may further include displaying a setup image enabling the user to input the information on the installation region and the information on the content service provider when the display apparatus is not connected to the external network; and storing the information input through the setup image.

The network information may include setup information on the display apparatus for Wi-Fi based connection.

The determining and storing the installation region of the display apparatus and information on a content service provider in the region from the network information may include determining the installation region based on Wi-Fi positioning system (WPS) information of the network information, and determining the content service provider based on at least one from among a received signal strength indication (RSSI), wireless Internet service providers (WISP) and a service set identifier (SSID).

The determining the installation region of the display apparatus may include acquiring and storing a channel map corresponding to the installation region of the display apparatus and skipping a stage of scanning a broadcast signal to generate the channel map among the setup stages.

The display apparatus may communicate with a server in which data of the channel map corresponding to each region is already stored, and the acquiring and storing the channel map corresponding to the installation region of the display apparatus may include transmitting the information on the installation region of the display apparatus to the server to receive the channel map corresponding to the installation region, from the server.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
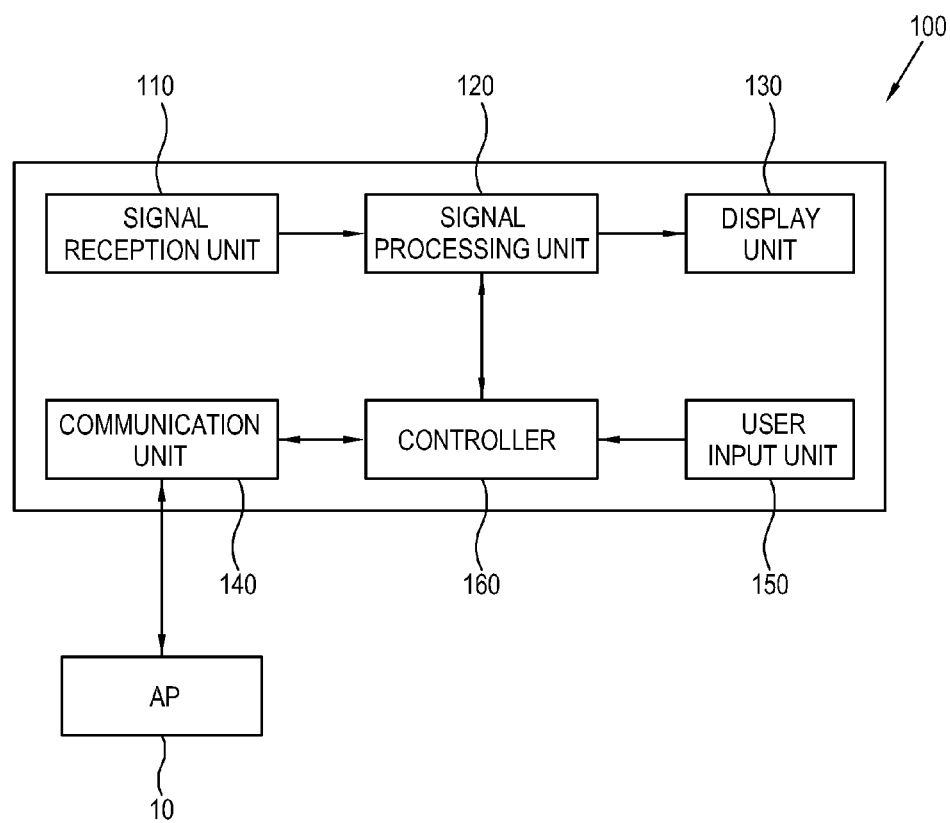
FIG. 1 is a block diagram illustrating a configuration of a display apparatus according to a first exemplary embodiment.

Below, exemplary embodiments will be described in detail with reference to the accompanying drawings. The exemplary embodiments may be embodied in various forms without being limited to the exemplary embodiments set forth herein. Descriptions of well-known parts are omitted for clarity and conciseness, and like reference numerals refer to like elements throughout.

FIG. 1 is a block diagram illustrating a configuration of a display apparatus 100 according to an exemplary embodiment. In the present exemplary embodiment, the display apparatus 100 is provided as a TV which receives a broadcast signal from a broadcast service provider to display a broadcast image. However, the display apparatus 100 may be provided as various forms and types of devices, such as a portable media player and a mobile phone, without being limited to the TV.

As shown in FIG. 1, the display apparatus 100 includes a signal reception unit 110 to receive an image signal from an external image source (not shown), a signal processing unit 120 to process an image signal received by the signal reception unit 110 according to a preset image processing process, a display unit 130 to display an image based on an image signal processed by the signal processing unit 120, a communication unit 140 connected with a communication network to communicate therewith, a user input unit 150 to generate an operation instruction command according to a user manipulation, and a controller 160 to control operations of all components of the display apparatus 100.

The signal reception unit 110 receives an image signal or image data from a content provider, that is, a service provider that provides various kinds and forms of content, and transmits the image signal or image data to the signal processing unit 120. The signal reception unit 110 receives an image signal via a wire or wirelessly. The signal reception unit 110 may be configured as various types based on standards of received image signals or configurations of the display apparatus 100. In the present exemplary embodiment, the display apparatus 100 is a TV. When the image signal is a broadcast signal, the signal reception unit 110 includes a tuner to tune the broadcast signal by each channel.

The signal reception unit 110 may receive an image signal in both analog mode and digital mode, without being limited to either one. For example, the signal reception unit 110 may receive a radio frequency (RF) signal transmitted from a broadcast service provider and image signals in accordance with composite video, component video, super video, SCART, high definition multimedia interface (HDMI), DisplayPort, unified display interface (UDI) or wireless HD standards.

The signal processing unit 120 performs various image processing processes on the image signal transmitted from the signal reception unit 110. The signal processing unit 120 outputs a processed image signal to the display unit 130, thereby displaying an image on the display unit 130.

The signal processing unit 120 may perform any kind of image processing, without being limited to, for example, decoding corresponding to an image format of image data, de-interlacing, frame refresh rate conversion, scaling, noise reduction to improve image quality, detail enhancement, or the like. The signal processing unit 120 may be provided as an image processing board (not shown) on which an integrated multi-functional component, such as a system on chip (SOC), or separate components to independently conduct individual processes, are mounted.

The display unit 130 displays an image based on an image signal output from the signal processing unit 120. The display unit 130 may be configured in various display modes using liquid crystals, plasma, light emitting diodes, organic light emitting diodes, a surface conduction electron emitter, a carbon nano-tube, nano-crystals, or the like.

The display unit 130 may further include an additional component depending, on its display mode. For example, in a display mode using liquid crystals, the display unit 130 includes a backlight unit (not shown) to provide light to a liquid crystal display panel and a panel driving board (not shown) to drive the panel.

The communication unit 140 is connected to a local area network (LAN) or wide area network (WAN) in accordance with a preset communication protocol for communications. The communication unit 140 is connected to an external device (not shown) via the LAN and connected to a server (not shown) via the WAN, thereby conducting two-way communications to transmit and receive data.

Both wire-based and wireless communication protocols may be used for the communication unit 140 to be connected to a device external to the display apparatus 100 for communications. As a wireless mode, the communication unit 140 may connect to an access point (AP) 10 connected to the WAN in accordance with an infrastructure mode of a Wi-Fi standard.

The present exemplary embodiment shows that the communication unit 140 and the signal reception unit 110 are separated components, which is just an illustrative example. The communication unit 140 and the signal reception unit 110 may be integrated into a single communication interface depending on the design and may correspond to various types of communication protocols in the communication interface.

The user input unit 150 transmits a preset control command to the controller 160 based on a user manipulation or input, so that the controller 160 performs an operation corresponding to the command. The user input unit 150 may be configured as various types, for example, a menu key and an input panel installed on an outside of the display apparatus 100 or as a remote controller separate from the display apparatus 100.

Alternatively, the user input unit 150 may be configured as a sensor to detect various gestures of a user, a camera to take a picture of the user or a microphone to detect a voice of the user.

The display apparatus 100 with such a structure may be a consumer electronic (CE) product that is enabled by the user inputting appropriate settings for use in a particular environment after being purchased. When the display apparatus 100 as a CE product is turned on for the first time after being installed in a user desired environment, the display apparatus 100 provides a service of inputting appropriate settings for use in a particular environment or adjusting default settings with respect to various functions thereof. This service is defined as an initial setup service.

The initial setup service is needed, because a content service provider may provide a recommended service suitable for a user based on information on the user input through the initial setup service.

In order that the display apparatus 100 provided as a TV displays a broadcast image, one of a plurality of broadcast service providers may need to provide a broadcast signal to the display apparatus 100. As a plurality of broadcast service providers may be present in the same region, the user generally makes a contract with one of the providers and the display apparatus 100 receives a broadcast signal from the service provider in the contract.

So that the display apparatus 100 provides a recommended service corresponding to the user, information on a region in which the display apparatus is installed 100 and information on the broadcast service provider that the display apparatus 100 receives a broadcast signal from, may need to be specified. The broadcast service provider may provide recommended information suitable for the region of the display apparatus 100 based on the information received from the display apparatus 100.

The controller 160 may provide the initial setup service to the user so that the user inputs such information in the initial setup service. When system power is turned on for the first time, the controller 160 starts the initial setup service and sequentially displays a setup image of each function so that the user individually sets up each function.

That is, the controller 160 displays a first setup image for setting up a first function. In this state, when one of a plurality of options of the first function is determined via the user input unit 150 and an instruction to transition to a next setup sequence is received, the controller 160 stores the determined option of the first function and displays a second setup image for setting up a second function in a next sequence.

Figure 2:
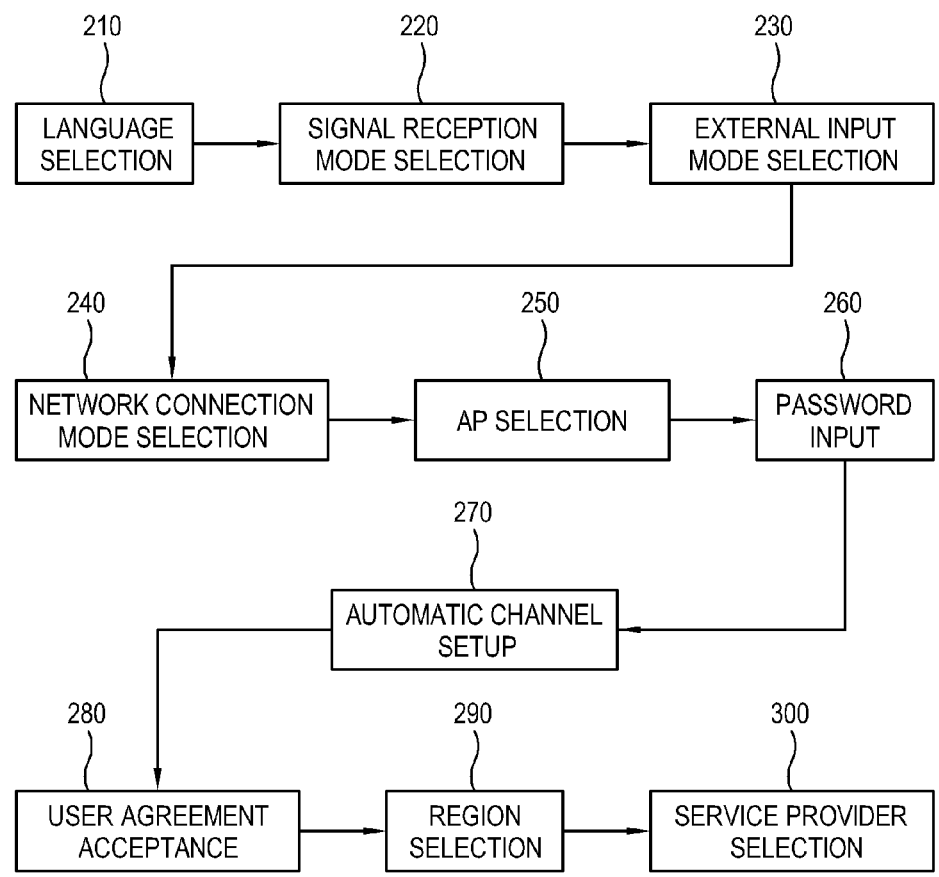
FIG. 2 illustrates a function setup stage of an initial setup service implemented in the display apparatus of FIG. 1.

FIG. 2 illustrates a function setup stage of an initial setup service implemented in the display apparatus 100. FIGS. 3 to 11 illustrate a setup image of each stage of the initial setup service.

As shown in FIG. 2, when the user turns on the display apparatus 100 after purchase and installation at a desired place, the display apparatus 100 implements a preset process code of the initial setup service.

For example, the initial setup service is carried out sequentially as follows. The display apparatus 100 first displays a guide image reporting that the initial setup service is started and then sequentially displays setup images corresponding to stages of language selection 210, signal reception mode selection 220, external input mode selection 230, network connection mode selection 240, AP selection 250 in a case of a wireless network connection, password input for connection 260, automatic channel setup 270, user agreement acceptance request 280, region selection 290, and service provider selection 300.

The user selects and determines a desired setup option through the user input unit 150 with a setup image of each stage. Then, the display apparatus 100 stores a determined result and goes to a next stage.

The stages of the initial setup service are provided for illustrative purposes only. Items determined in the initial setup service or order thereof may be changed depending on a design of the display apparatus 100, and the foregoing example is not construed as limiting the idea of the present exemplary embodiment.

Figure 3:
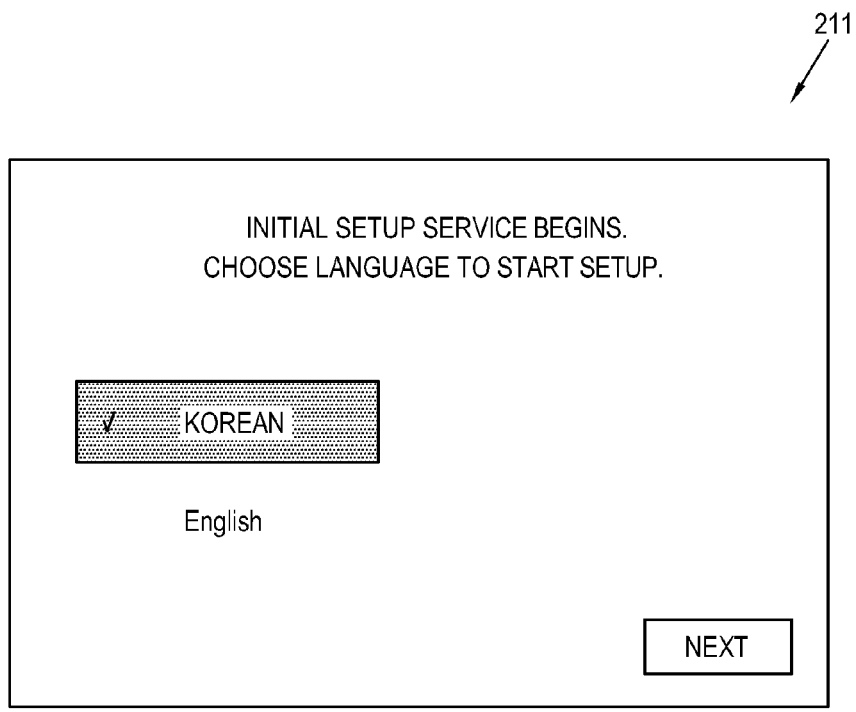
FIGS. 3 to 11 illustrate a setup image of each stage of the initial setup service.

As shown in FIG. 3, in the language selection stage 210, the display apparatus 100 displays a setup image 211 so as to select one of a plurality of available languages. The setup image 211 is provided to enable selection of one of, for example, Korean and English and may additionally include various language options, such as French, German, Russian, Spanish, Italian, Chinese and Japanese, for selection depending on availability.

The display apparatus 100 designates a language selected by the user on the displayed setup image 211 as a service language provided by the display apparatus 100. Accordingly, the display apparatus 100 displays subsequent setup images of the initial setup service in selected language.

Figure 4:
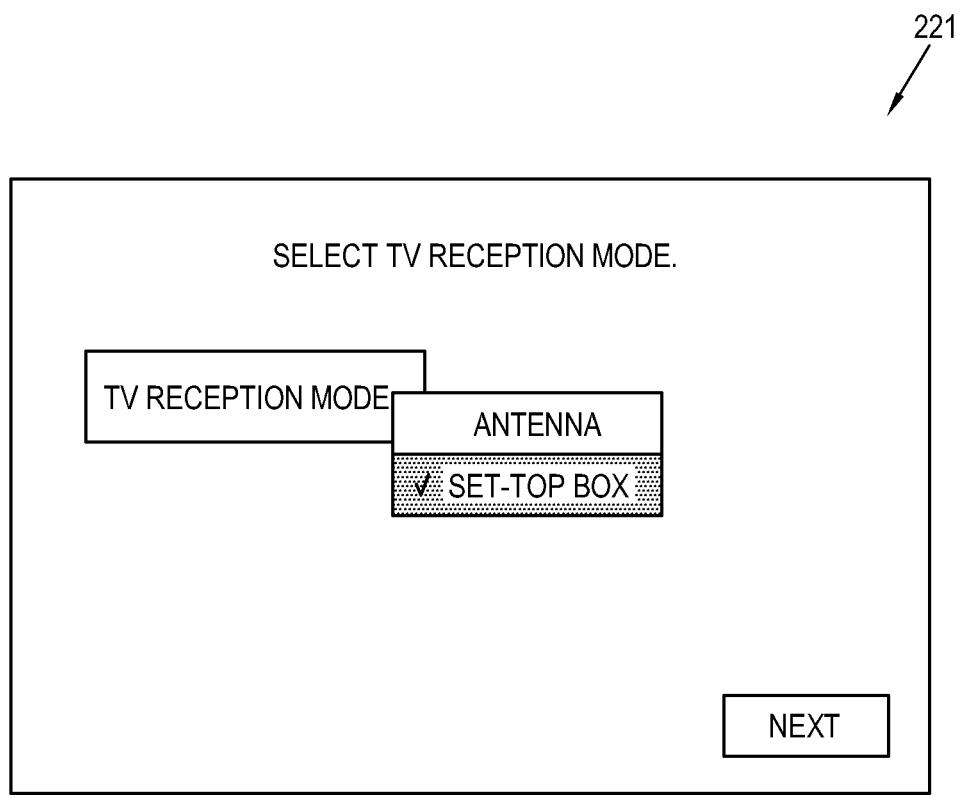

When language selection is finished in the language selection stage 210, the display apparatus 100 goes to the signal reception mode selection stage 220 and displays a setup image 221 corresponding to the stage 220 (see FIG. 4).

As shown in FIG. 4, the setup image 221 is provided so as to select a mode of the display apparatus 100 receiving a broadcast signal. The mode of receiving the broadcast signal may include, for example, a sky wave mode in which a broadcast signal is received via an antenna and a mode in which a broadcast signal is received from a set-top box locally connected via a cable.

Figure 5:
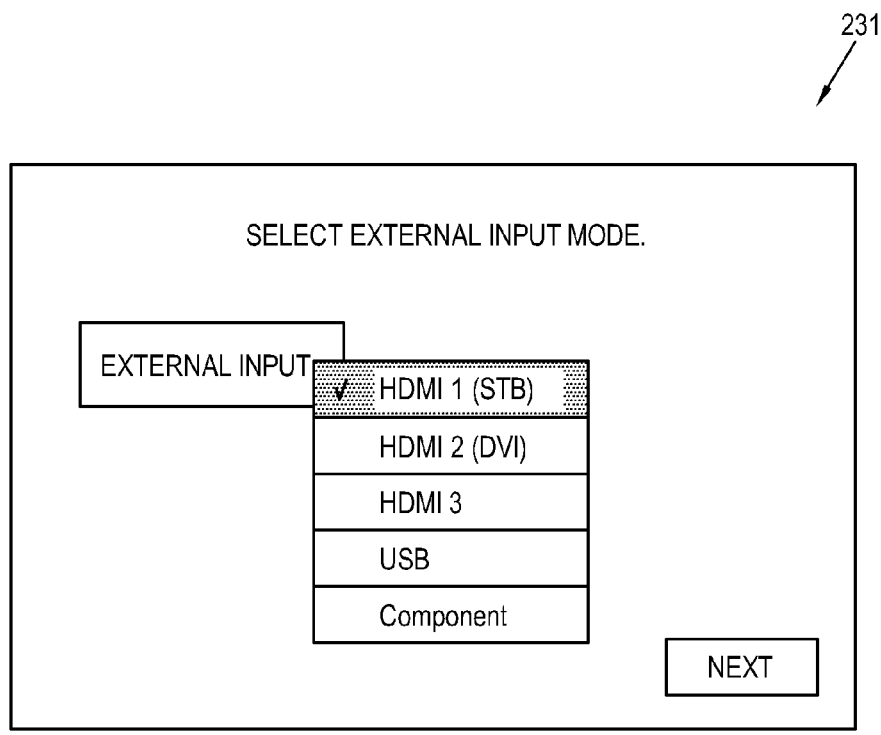

When a signal reception mode is determined in the signal reception mode selection stage 220, the display apparatus 100 goes to the external input mode selection stage 230 and displays a setup image 231 corresponding to the stage 230 (see FIG. 5).

As shown in FIG. 5, the setup image 231 is provided so that the display apparatus 100 selects an input mode, a reception mode and a port of a signal input to the signal reception unit 110. For example, the signal reception unit 110 provides a plurality of HDMI ports, USB ports and component ports, and the user selects and designates one of these ports to receive a signal through the selected port.

Figure 6:
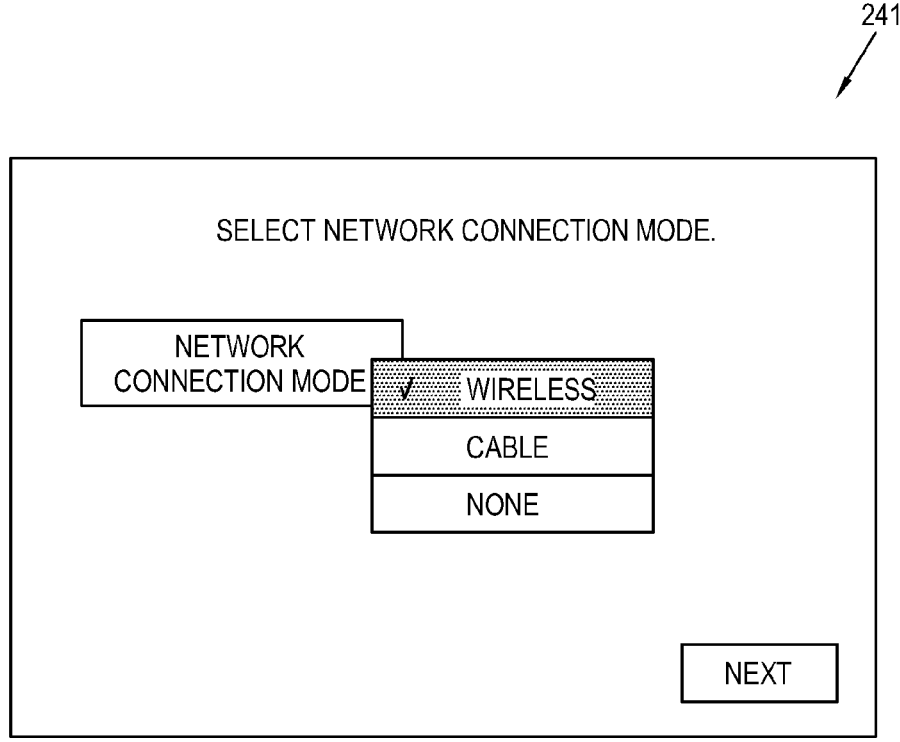

When the external input mode selection stage 230 is finished, the display apparatus 100 goes to the network connection mode selection stage 240 and displays a setup image 241 corresponding to the stage 240 (see FIG. 6).

As shown in FIG. 6, the setup image 241 is provided so that the communication unit 140 of the display apparatus 100 selects a connection mode by which to connect to a network for communications. For example, the communication unit 140 may connect to the network via a wire-based or wireless method, and the user may select one of these methods. Alternatively, the user may set the display apparatus 100 not to connect to the network.

In the present exemplary embodiment, the wireless method is selected for the communication unit 140 to connect to the network.

Figure 7:
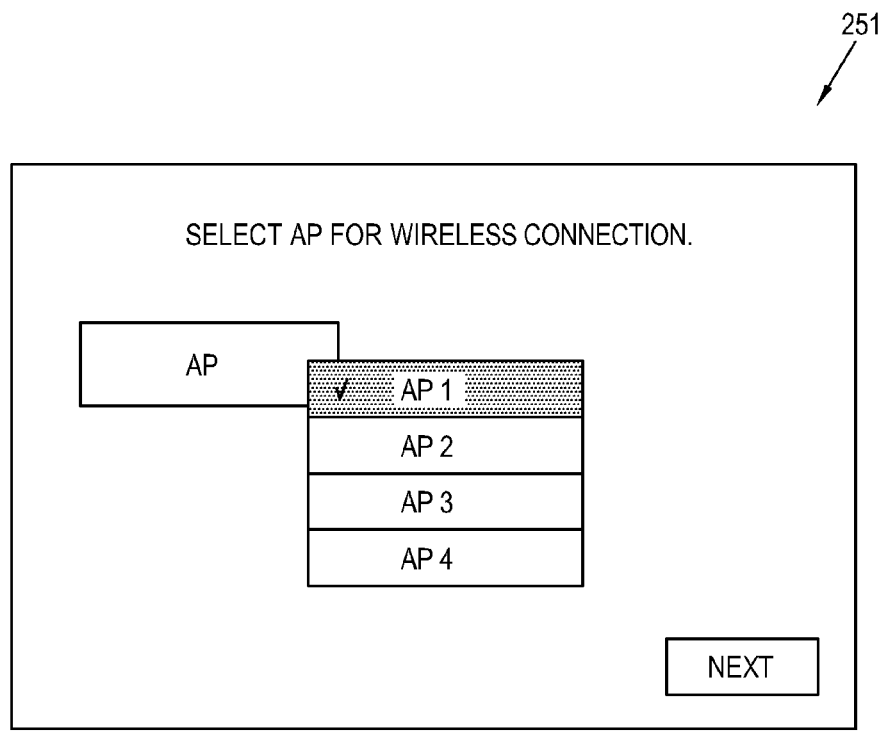

When the wireless connection method is selected on the setup image 241, the display apparatus 100 goes to the AP 10 selection stage 250 so that the display apparatus 100 connects to the network wirelessly, and displays a setup image 251 corresponding to the stage 250 (see FIG. 7).

As shown in FIG. 7, the setup image 251 is provided so that the communication unit 140 selects at least one available AP 10 within a region where the display apparatus 100 is installed when the communication unit 140 connects wirelessly for communications. APs 10 may be displayed on the setup image 251 as identifiers, for example, AP1 AP2, AP3 and AP4. The user selects any one of the APs 10 displayed on the setup image 251 and instructs the communication unit 140 to connect to the selected AP 10.

Figure 8:
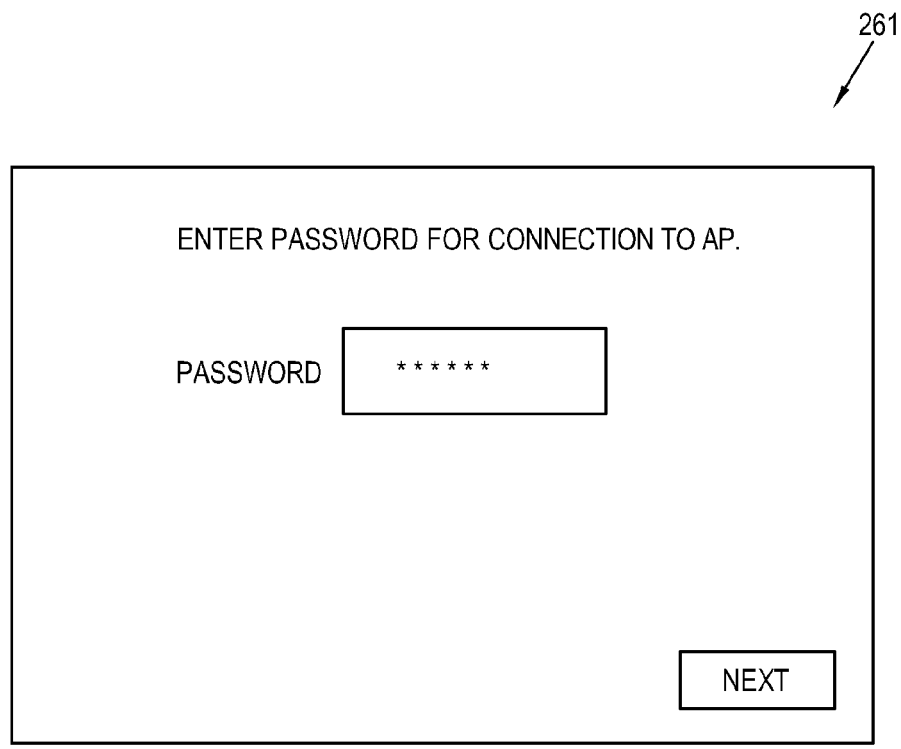

When the AP 10 is selected in the AP 10 selection stage 250, the display apparatus 100 goes to the preset password input stage 260 so as to connect to the selected AP 10 and displays a setup image 261 corresponding to the stage 260 (see FIG. 8).

As shown in FIG. 8, the setup image 261 is provided for inputting the password to connect to the AP 10 selected in the previous stage 250. Generally, a password for connection is preset for the AP 10 in view of security and only a device that requests connection with the password is allowed to connect to the AP 10.

Here, there is an AP 10 which does not set a password for connection and allows a plurality of random devices to connect thereto, in which case a connection to the AP 10 may be carried out immediately after the stage 250 without the stage 260.

When the password is successfully input in the password input stage 260, the display apparatus 100 is connected to the AP 10 for communications. In a Wi-Fi mode, the display apparatus 100 may acquire various kinds of information in establishing communication with the AP 10, for example, information on a Wi-Fi positioning system (WPS), wireless Internet service providers (WISP) and a service set identifier (SSID). Such information may be received from the AP 10 while the display apparatus 100 establishes the communication.

Figure 9:
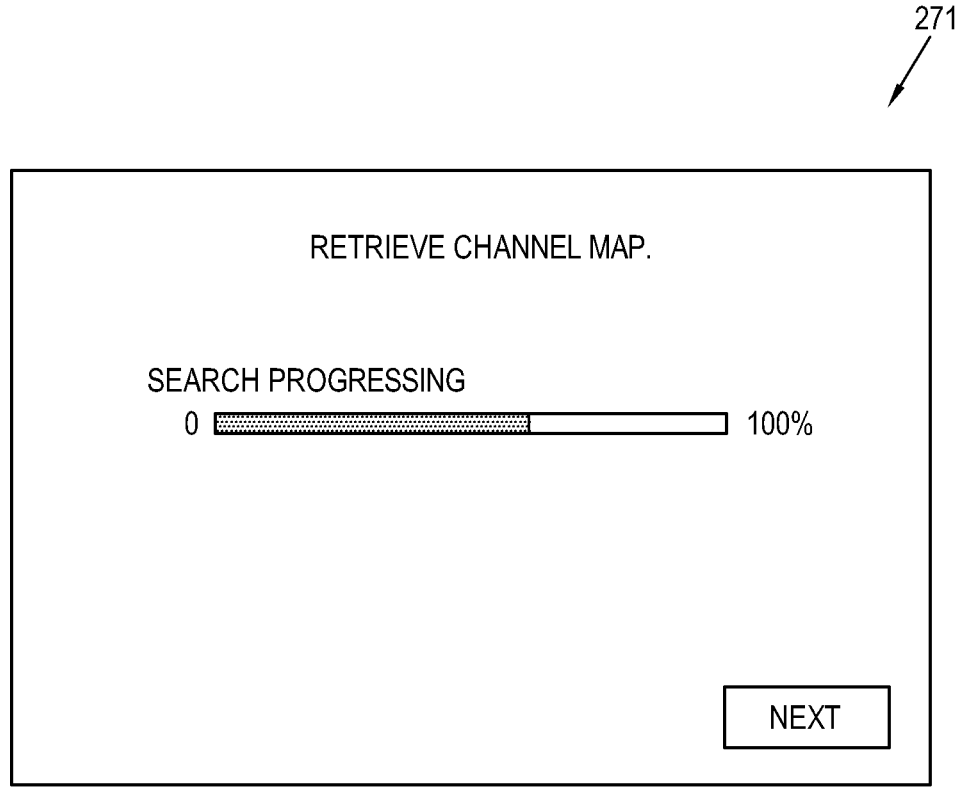

When connection to the network is completed, the display apparatus 100 goes to the automatic channel setup stage 270 for generating a channel map and displays a setup image 271 corresponding to the stage 270 (see FIG. 9).

As shown in FIG. 9, the setup image 271 is provided so that each channel of broadcast signals currently input to the display apparatus 100 is retrieved to construct a channel map and the channel map is stored in the display apparatus 100.

The channel map is a list or database obtained by mapping a channel number and a channel name/call signal by a frequency. Since the display apparatus 100 may receive different channel maps of broadcast signals depending on regions of the display apparatus 100, providers of broadcast signals, and a channel map of broadcast signals currently received by the display apparatus 100 may need setting up in the initial setup service.

The channel map is generated by the display apparatus 100 scanning an entire effective frequency band of broadcast signals, and it may take a long time, for example, 10 minutes or longer, to generate the channel map based on a number of channels provided by broadcast signals. The generated channel map is stored in the display apparatus 100, and the display apparatus 100 selects or changes a channel based on the stored channel map when an instruction to change a channel is received from the user.

When the channel map is generated and stored, the display apparatus 100 goes to the stage 280 for requesting the user to accept the user agreement and displays a setup image (not shown) corresponding to the stage 280.

Figure 10:
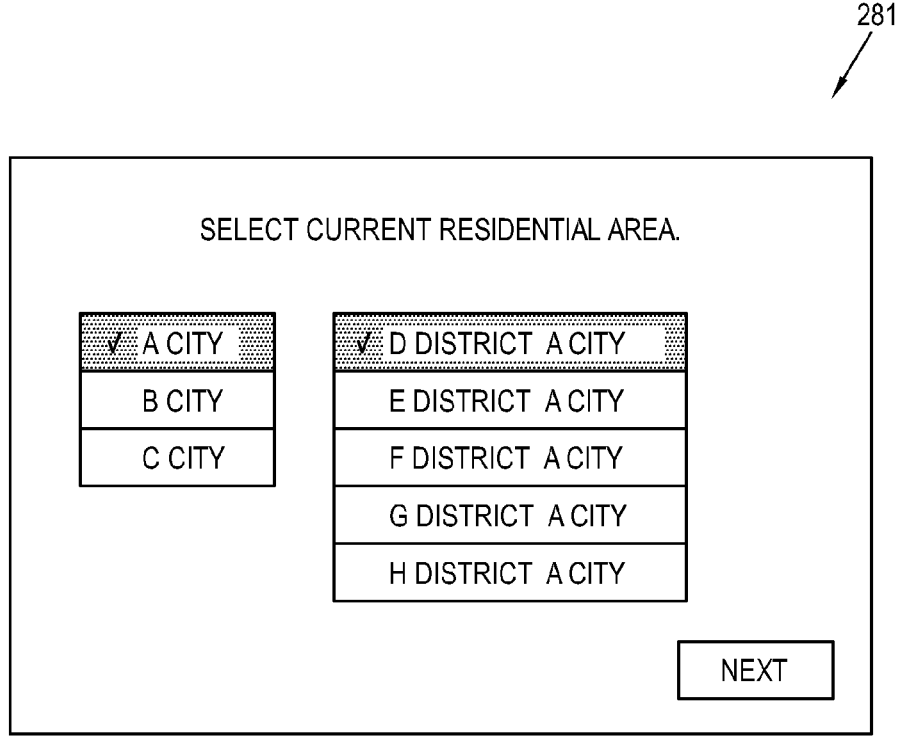

When the user accepts the user agreement, the display apparatus 100 goes to the region selection stage 290 for selecting a current region of the user, that is, a region in which the display apparatus 100 is currently installed, and displays a setup image 281 corresponding to the stage 290 (see FIG. 10).

As shown in FIG. 10, the setup image 281 is provided so that the user specifies an address of the current region. For example, the user may specify that the user is located in E region, A city, that is, the display apparatus 100 is installed in E region, A city, through the setup image 281. The setup image 281 may enable input of a detailed address depending on a design, and the example of FIG. 10 is provided only for illustrative purposes.

Figure 11:
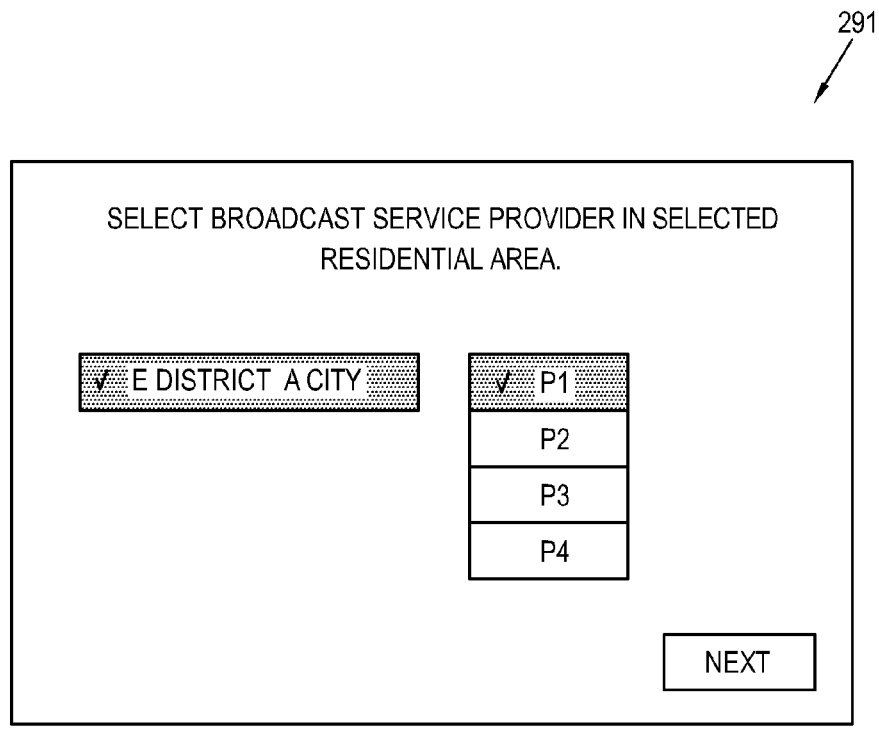

When the region where the display apparatus 100 is currently installed is specified in the region selection stage 290, the display apparatus 100 goes to the service provider selection stage 300 and displays a setup image 291 corresponding to the stage 300 (see FIG. 11).

As shown in FIG. 11, the setup image 291 is provided so that one provider is selected among one or more content service providers in the selected region in the previous stage 290, for example, one or more broadcast service providers. Since a plurality of broadcast service providers may be present in each region, the setup image 291 displays identifiers of the providers P1, P2, P3 and P4 for selection. The user may select an identifier of one provider through the setup image 291.

The region selection stage 290 and the service provider selection stage 300 of the initial setup service may be needed in the following case.

The display apparatus 100 may provide a recommendation service suitable for the user, in which case a region of the display apparatus 100 and information on a broadcast service provider may need to be specified. For instance, to provide today's weather information to the user, the display apparatus 100 specifies the region where the display apparatus 100 is currently installed and a provider that provides a broadcast service to the display apparatus 100 and requests the specified provider for weather information on the specified region.

However, as described above, it may not be easy and it may be inconvenient for the user to input all such details in the initial setup service. Although a plurality of pieces of information that the user inputs in the initial setup service is necessary so that the display apparatus 100 can recommend a channel suiting a user's taste, to cause the user the above-described inconvenience during the initial setup service may bother the user.

Thus, according to the present exemplary embodiment, the controller 160 of the display apparatus 100 determines an installed region of the display apparatus 100 and information on a content service provider in the region from information on a network based on a wireless communication protocol set up for connection of the communication unit 140 to an external network, and stores the information. The controller 160 is provided with a recommendation service corresponding to the region from the determined and stored content service provider and controls the display unit 130 to display an image of the recommendation service.

Accordingly, the display apparatus 100 may provide the user with the recommendation service suitable for the user.

Regarding the stages of the initial setup service shown in FIG. 2, when the password input stage 260 is completed, the communication unit 140 is wirelessly connected to the network. In the present exemplary embodiment, Wi-Fi is employed as a wireless communication protocol for connection of the communication unit 140 to the network.

In the Wi-Fi mode, the communication unit 140 needs network information to wirelessly connect to the network, that is, the AP 10, for example, on WPS, WISP and SSID information. The WPS information specifies a location of the AP 10, the WISP information specifies a network/Internet service provider or operator, and the SSID is an identifier of the AP 10.

That is, the controller 160 may determine a region in which the display apparatus 100 is currently installed from the WPS information. Also, the controller 160 may specify, from the WISP information, a provider that provides a network service so that the communication unit 140 connects to a network. In the TV, the network service provider is generally the same as a content service provider, and thus the controller 160 may specify a content service provider from the WISP information.

Alternatively, since the SSID information on the access point 10 may include information to deduce the network service provider, the controller 160 may specify the content service provider from the SSID information. For example, the SSID information is the identifier of the access point 10 and thus includes a keyword to determine a provider that provides a communication service to the AP 10. Also, the controller 160 may specify the network service provider using both the WISP information and the SSID information.

Here, the controller 160 may have difficulty in choosing any one SSID information so as to specify the network service provider. In this case, the controller 160 may deduce the network service provider from SSID information on a signal with highest strength among a plurality of retrieved network signals. For example, the controller 160 may select an AP 10 outputting a strongest communication signal among Wi-Fi based communication signals output from a plurality of APs 10 and specify a network service provider from SSID information on the selected AP 10.

Here, the controller 160 may determine a signal with highest reception strength, that is, a signal with highest strength, based on a received signal strength indication (RSSI) of network information.

In this way, the controller 160 may determine the installed region of the display apparatus 100 and the information on the content service provider. In this case, the controller 160 skips the region selection stage 290 and the service provider selection stage 300 of the initial setup service.

However, when the communication unit 140 is set up not to connect to the network, the controller 160 may conduct the region selection stage 290 and the service provider selection stage 300.

In the present exemplary embodiment, the foregoing method and process are carried out in the initial setup service of the display apparatus 100. However, the method may be conducted not only in the initial setup service but at different times. For example, the display apparatus 100 is set up not to be connected to the network in the initial setup service, and is connected to a new network when being used. In this case, the display apparatus 100 may conduct the method according to the present exemplary embodiment at a time when the display apparatus 100 is connected to the network.

Figure 12:
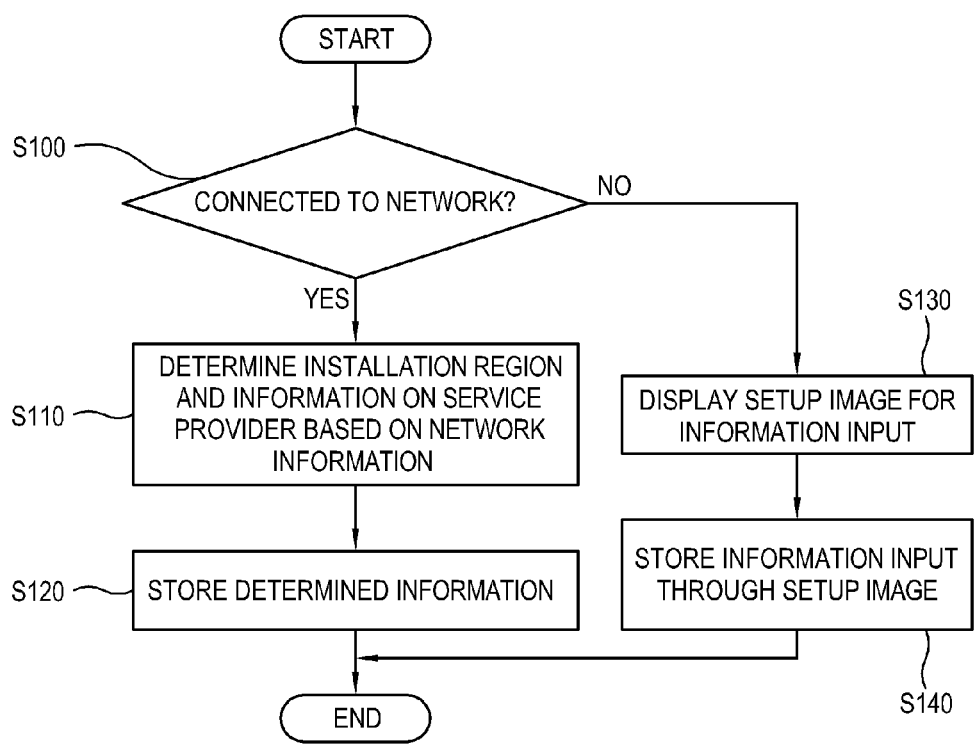
FIG. 12 is a flowchart illustrating a control method of the display apparatus of FIG. 1.
Figure 13:
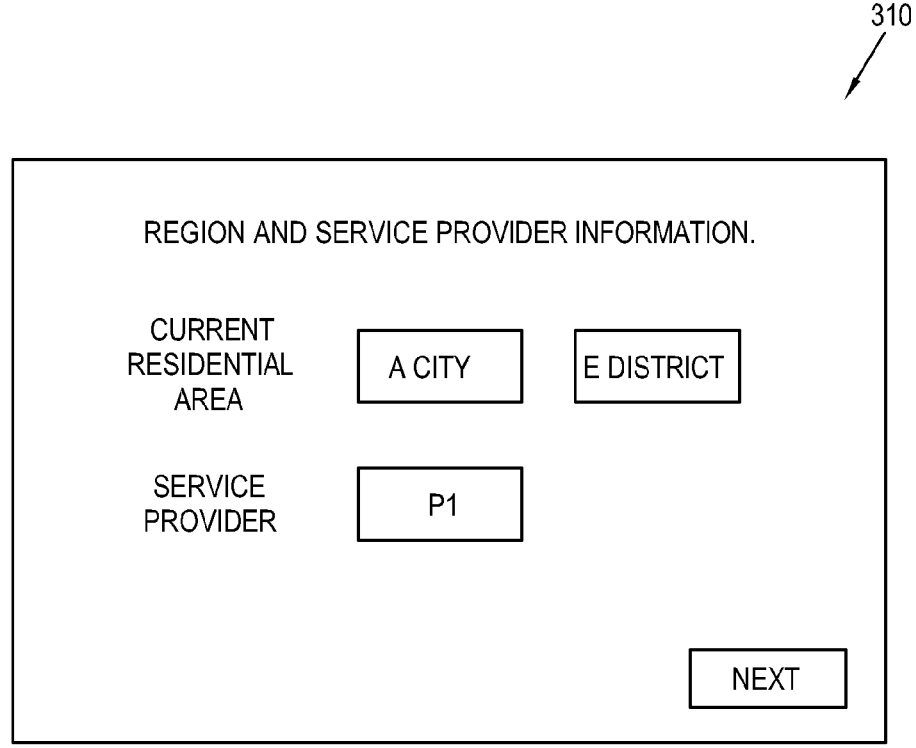
FIG. 13 illustrates a setup image provided for inputting an installation region of the display apparatus of FIG. 1 and information on a content service provider.

FIG. 12 is a flowchart illustrating a control method of the display apparatus 100 according to an exemplary embodiment. FIG. 13 illustrates a setup image 310 provided for inputting an installation region of the display apparatus 100 and information on a content service provider.

As shown in FIG. 12, the display apparatus 100 determines whether the display apparatus 100 is connected to a network for communication in operation S100.

When the display apparatus 100 is connected to the network, the display apparatus determines an installation region of the display apparatus 100 and information on a content service provider based on network information in operation S110. The display apparatus 100 stores the determined information in operation S120.

Accordingly, the display apparatus 100 may be provided with a recommendation service from the content service provider based on the determined and stored information.

However, when the display apparatus 100 is not connected to the network, the display apparatus 100 displays the setup image 310 shown in FIG. 13 for inputting the installation region and the information on the content service provider in operation S130. The setup image 310 may provide multiple choice options of regions and providers or enable direct input of an address or zip code.

When information is input through the setup image 130, the display apparatus 100 stores the input information in operation S140.

Meanwhile, after operation S110, the display apparatus 100 may display the determined information in a form of the setup image 310 for verification and authentication of the user. In this case, when the user verifies and authenticates the determined information, the display apparatus 100 goes to operation S120.

In the foregoing exemplary embodiment, the installation region and the service provider are specified based on the network information and the region selection stage 290 and the service provider selection stage 300 of the initial setup service of FIG. 2 are skipped. However, the present exemplary embodiment is not limited to the aforementioned illustration, and the display apparatus 100 may obtain information on a channel map of received broadcast signals based on the network information, which is described below.

In the initial setup service described with reference to FIGS. 2 to 11, the channel map is created in the automatic channel setup stage (see 270 of FIG. 2 and 271 of FIG. 9). However, as described above, scanning all broadcast signals may be needed to create the channel map, which may take a substantial time, for example, 10 to 20 minutes depending on broadcast signals. Further, not only creating the channel map but also a plurality of setup stages is carried out in the initial setup service, and the stage of creating the channel map is a major cause of increase in required time for the initial setup service.

Thus, the present exemplary embodiment suggests the following method.

Figure 14:
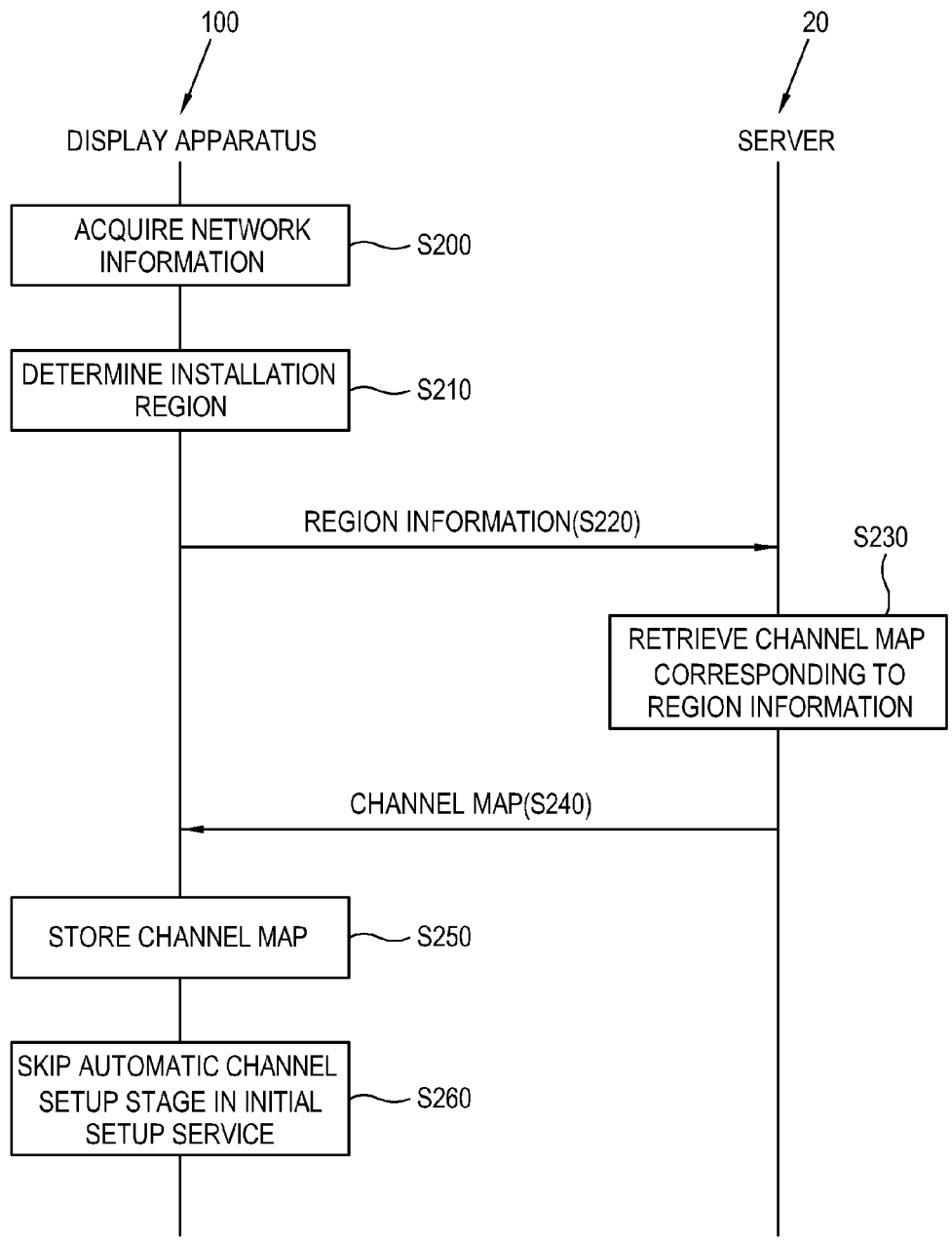
FIG. 14 illustrates an information transmission relationship between a display apparatus and a server according to a second exemplary embodiment.

FIG. 14 illustrates an information transmission relationship between a display apparatus 100 and a server 20.

As shown in FIG. 14, the display apparatus 100 is connected to the server 20 to communicate therewith via a network.

The server 20 communicates with a plurality of display devices 100 and stores a database of channel maps respectively corresponding to various regions. When region information on one display apparatus 100 is received from the display apparatus 100, the server 20 retrieves data of a channel map corresponding to the region from the database and provides the retrieved channel map to the display apparatus 100.

In detail, the display apparatus 100 acquires network information obtained in the initial setup service, for example, information on a wireless communication protocol based network set for connection to an external network (S200). The display apparatus 100 determines an installation region of the display apparatus 100 based on the acquired network information (S210). Determining the region may be carried out by the same method as in the first exemplary embodiment, and thus description thereof is omitted herein.

The display apparatus 100 transmits information on the determined region to the server 20 (S220).

The server 20 retrieves data of a channel map corresponding to the region information received from the display apparatus 100 from the stored database of regions and channel maps (S230). The server 20 transmits the retrieved data of the channel map to the display apparatus 100 (S240).

The display apparatus 100 stores the channel map received from the server 20 (S250). The display apparatus 100 skips the automatic channel setup stage 270 of FIG. 2 for generating a channel map in the initial setup service (S260).

If the display apparatus 100 does not determine the installation region in operation S210, the display apparatus 100 performs the automatic channel setup stage in the initial setup service.

Further, if the server 20 does not find the channel map corresponding to the region information in operation S230, the server 20 notifies the display apparatus 100 that the channel map is not found. Then, the display apparatus 100 performs the automatic channel setup stage in the initial setup service.

The foregoing process is carried out between the time when the display apparatus 100 acquires the network information and the time when the display apparatus 100 performs the automatic channel setup stage in the initial setup service.

According to the method, the display apparatus 100 specifies region information based on obtained network information and acquires a channel map corresponding to the specified region, thereby skipping a stage of creating a channel map in the initial setup service. Thus, a channel scanning operation, which takes a long time in the initial setup service, may be omitted to simplify the initial setup service and to reduce required time for the initial setup service.

Meanwhile, operation S220 in which the display apparatus 100 transmits the region information to the server 20 may be performed automatically.

Alternatively, when the display apparatus 100 determines the installation region in operation S290, the display apparatus 100 may display an image showing the region for verification by the user before operation S220. Here, when the user confirms that the region information shown on the image is correct, the display apparatus 100 may transmit the region information to the server 20.

The exemplary embodiments described above may be summarized as follows.

The display apparatus 100 provides an initial setup service such that a plurality of setup stages enabling the user to adjust a plurality of preset functions are sequentially performed. When network information for communications of the display apparatus 100 with an external network is set up during the initial setup service, the display apparatus 100 deduces an installation region of the display apparatus 100 based on the network information and automatically performs at least part of the setup stages of the initial setup service based on information on the installation region. Here, the automatically performed setup stages are not provided to the user but are omitted during the initial setup service.

As such, some setup stages of the initial setup service to be set up by the user are automatically carried out, thereby simplifying the initial setup service and reducing required time for the initial setup service.

In the foregoing exemplary embodiments, the display apparatus 100 determines the installation region of the display apparatus 100 and the information related to the content service provider of the corresponding region, from the network information. The network information is based on the wireless communication protocol set up to access the external network. However, the display apparatus 100 may access the external network based on a wired communication protocol as well as the wireless communication protocol.

Figure 15:
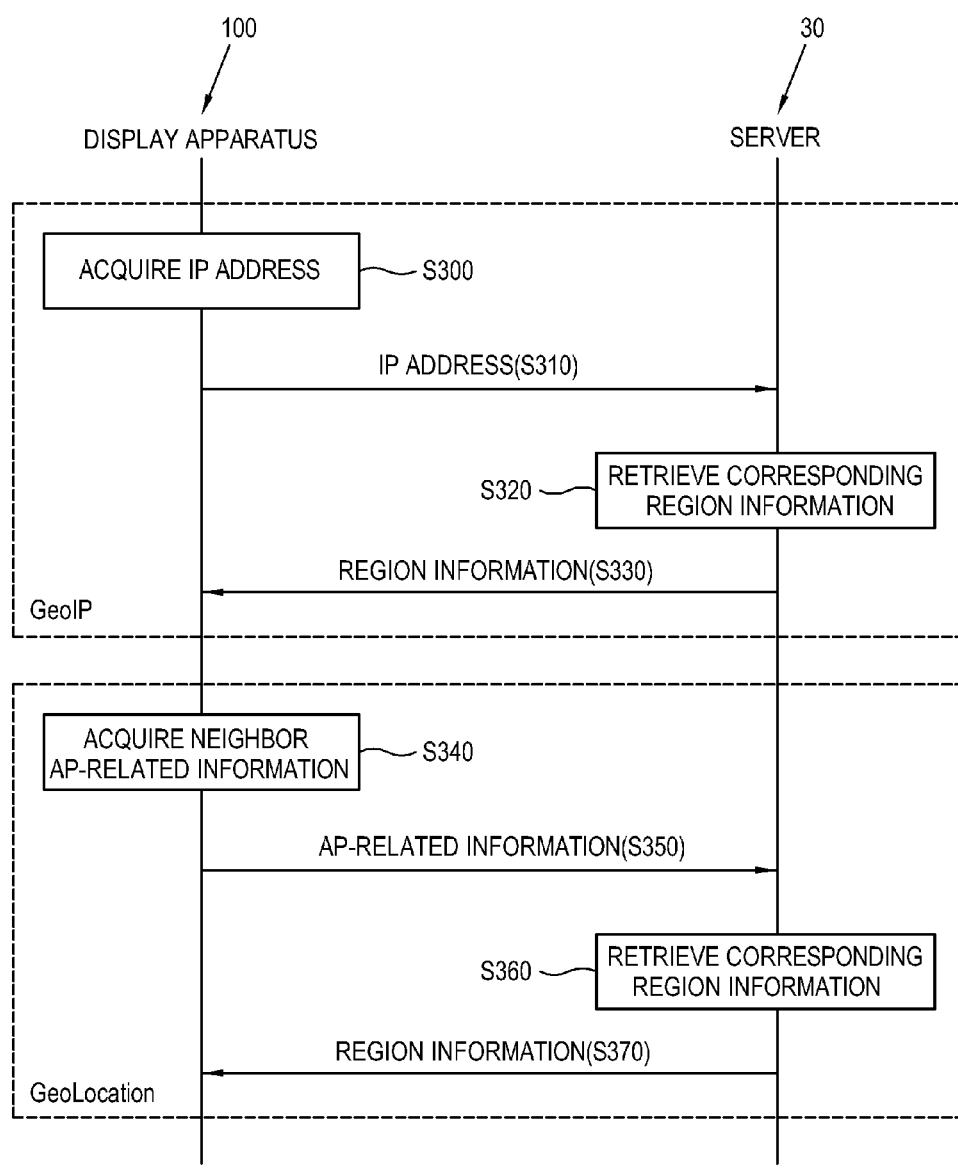
FIG. 15 illustrates a method where a display apparatus according to a third exemplary embodiment receives region information about the display apparatus.

FIG. 15 illustrates a method where a display apparatus 100 according to a third exemplary embodiment receives region information related to the display apparatus 100.

As show in FIG. 15, the display apparatus 100 communicates with a server 30 that stores a database related to the region information, and transmits acquired network information to the server 30, thereby obtaining the region information or position information corresponding to the relevant network information from the server 30.

The database constructed in the server 30 may be implemented in different forms according to protocols. For example, the database may be implemented based on IP address, where the region information corresponding to IP addresses is stored, or a database based on Wi-Fi, where the region information corresponding to access point (AP) information is stored. The former is called a GeoIP type, and the latter is called a GeoLocation type.

A method of acquiring the region information based on the GeoIP type is as follows. When the display apparatus 100 accesses the network through the wireless communication, the display apparatus 100 acquires the IP address at operation S300 and transmits the IP address to the server 30 at operation S310.

The server 30 retrieves the region information corresponding to the IP address received from the display apparatus 100 at operation S320, and transmits the region information to the display apparatus 100 at operation S330.

Also, a method of acquiring the region information based on the GeoLocation type is as follows. The display apparatus 100 accesses the network through the wireless communication of Wi-Fi, the display apparatus 100 acquires AP-related information including MAC address and RSSI about one or more accessible neighboring APs at operation S340, and transmits the AP-related information to the server 30 at operation S350.

The server 30 retrieves the region information corresponding to the AP-related information received from the display apparatus 100 at operation S360, and transmits the region information to the display apparatus 100 at operation S370.

Thus, the display apparatus 100 acquires the region information about its own position/location/region.

The region information may include address information specifying a nation and a location, or may include longitude and latitude information. For example, the GeoLocation type is applicable to even a display apparatus mounted to a moving car or a mobile display apparatus, thereby specifying the location of the current position.

However, the respective accuracy of the experimental results when specifying the location according to the GeoIP type and the GeoLocation type was as follows. When the GeoIP type is applied, the accuracy based on nation and city units is very high at close to 100% but the accuracy based on a zip code unit is very low. On the other hand, the GeoLocation type has a total accuracy higher than the GeoIP type, but may have a low accuracy in a certain region such as a boundary region of an administration address unit.

Accordingly, if the display apparatus 100 acquires the region information of the current region according to the GeoIP type or the GeoLocation type, it is difficult to guarantee the acquired region information will have an accuracy of 100%. Therefore, according to an exemplary embodiment, the display apparatus 100 may provide a user with the region information acquired based on the network information acquired at a stage of an initial setup service, so that the user can check it.

Figure 16:
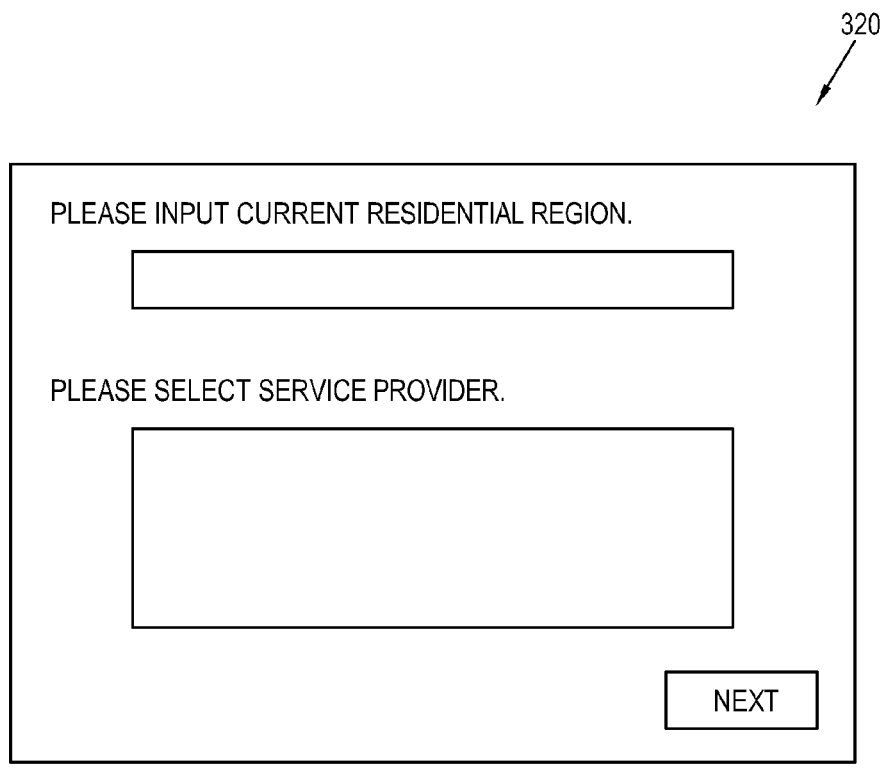
FIG. 16 illustrates an example of a UI image that offers a user input of the region information while the display apparatus according to the third exemplary embodiment provides an initial setup service.

FIG. 16 illustrates an example of a UI image that offers a user input of the region information while the display apparatus 100 according to the third exemplary embodiment provides the initial setup service.

As shown in FIG. 16, the display apparatus 100 displays a UI image 320 for requesting a user to select or input a current region of the display apparatus 100 and a service provider when the initial setup service is offered to him/her. If a user first selects the current region, the UI image 320 subsequently displays the service providers of the selected region. Thus, a user selects one among the service providers of the selected region after first selecting the region on the UI image 320, and then implements the initial setup service in the next stage.

In this exemplary embodiment, the UI image 320 may be displayed in the region selection stage 290 of FIG. 2.

If the display apparatus 100 does not acquire the region information based on the network information before the UI image 320 is displayed, the display apparatus 100 cannot show any content for allowing a user to input the region and the service provider on the UI image 320.

Figure 17:
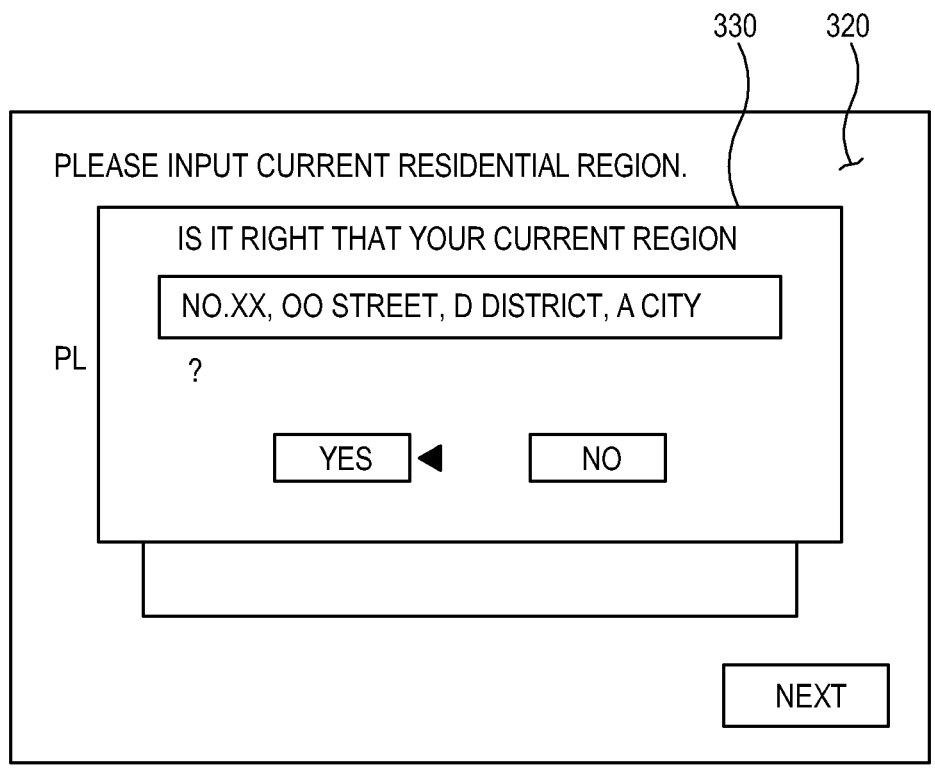
FIG. 17 illustrates an example of a popup image displayed on the UI image of FIG. 16 when the display apparatus according to the third exemplary embodiment acquires the region information.

FIG. 17 illustrates an example of a popup image 330 displayed on the UI image of FIG. 16 when the display apparatus 100 according to the third exemplary embodiment acquires the region information.

While the UI image 320 of FIG. 16 is being displayed, the display apparatus 100 determines whether the region information for specifying the current region is acquired.

Here, the region information can be acquired by the following method. The display apparatus 100 determines whether or not it can communicate with the external network. If the communication is enabled, the display apparatus 100 transmits the network information for the communication to the server 30 and receives and stores the region information corresponding to the network information from the server 30.

If it is determined that the region information is acquired, the display apparatus 100 displays a popup image 330 to be overlaid on the UI image 320 so that a user can select through the popup image 330 whether the acquired region information is correct. Then, a user determines whether the region information shown on the popup image 330 is correct or not, and selects Yes or No in accordance with the determination results.

Figure 18:
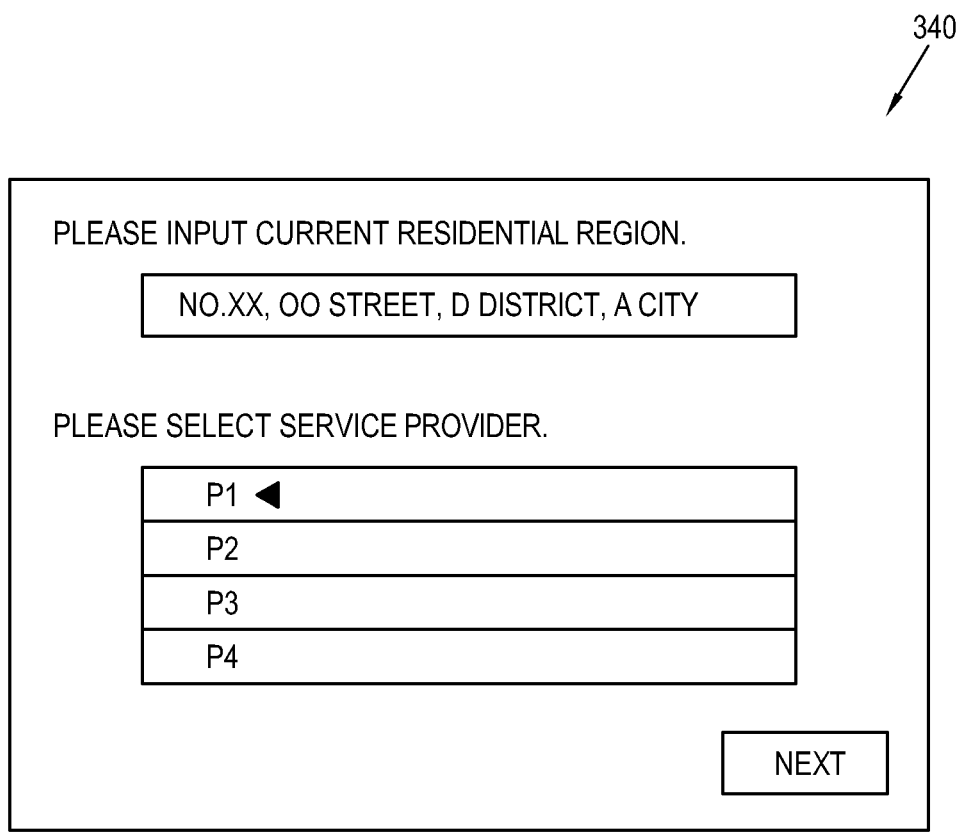
FIG. 18 illustrates an example of a UI image displayed when it is selected that the region information shown in the popup image of FIG. 17 is correct.

FIG. 18 illustrates an example of an UI image 340 displayed when it is selected that the region information shown in the popup image 330 of FIG. 17 is correct.

As shown in FIG. 18, if a user selects that the region information shown on the foregoing popup image 330 is correct, the display apparatus 100 displays the UI image 340 that shows one or more service providers to be selected corresponding to the relevant region information.

A user can select one among one or more service providers displayed on the UI image 340. If the user selects the service provider through the UI image 340, the display apparatus 100 enters the next stage of the initial setup service.

In this exemplary embodiment, the service providers shown on the UI image 340 is displayed corresponding to the selected region information. That is, if the region information is changed on the UI image 340, the display apparatus 100 displays new service providers corresponding to the changed region information on the UI image 340.

Figure 19:
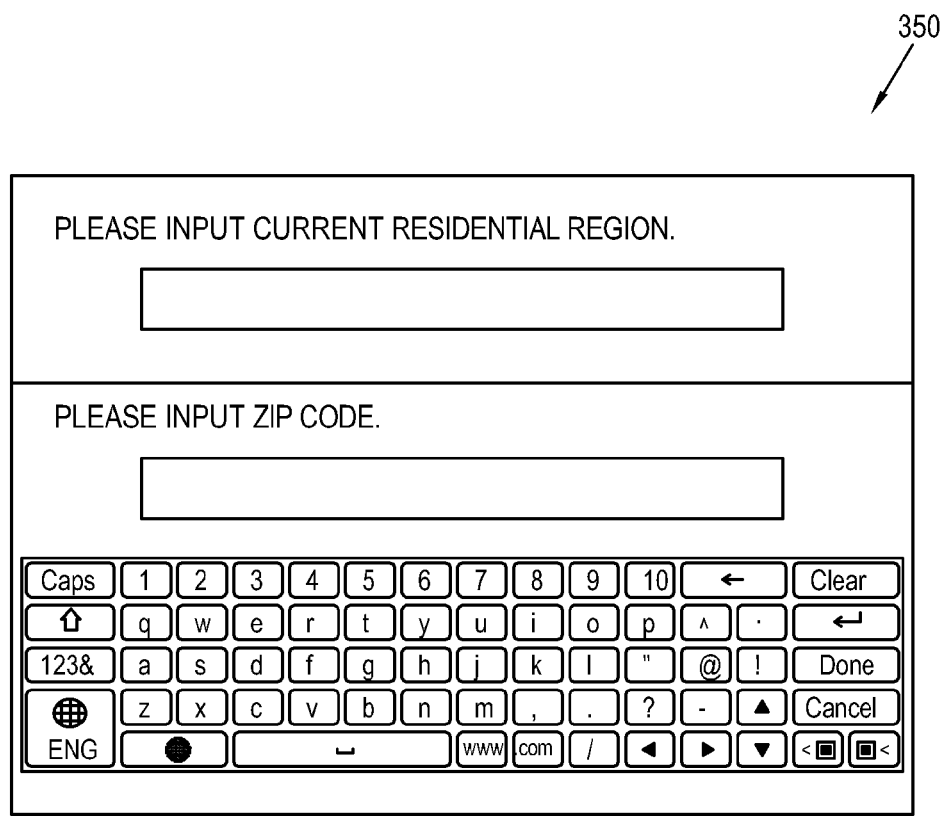
FIG. 19 illustrates an example of a UI image displayed when it is selected that the region information shown in the popup image of FIG. 17 is not correct.

FIG. 19 illustrates an example of an UI image 350 displayed when it is selected that the region information shown in the popup image 330 of FIG. 17 is not correct.

As shown in FIG. 19, if a user selects that the region information shown on the foregoing popup image 330 is not correct, the display apparatus 100 displays a UI image 350 that allows a user to directly input the region information.

The UI image 350 may include a keyboard image as shown in FIG. 19 so that a user can directly input a character and a numeral; or may show a plurality of selectable region addresses, one of which can be selected by the user, like the UI image 281 of FIG. 10.

If a user inputs the region information through the UI image 350, the display apparatus 100 provides one or more service providers corresponding to the input region information to be selected by a user.

Thus, the display apparatus 100 acquires the region information corresponding to the network information, and performs the initial setup service based on the acquired region information.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display unit;
   a signal processor which is configured to process a broadcasting signal to be displayed as an image on the display unit;
   a communicator which is configured to communicate via an access point with a first server which stores region information of the display apparatus and a second server which stores channel information of the broadcasting signal; and
   a controller which is configured:
   to control the communicator to connect with the access point,
   to transmit identification information of the connected access point to the first server,
   to receive the region information corresponding to the transmitted identification information of the access point from the first server,
   to transmit the received region information to the second server,
   to receive the channel information of the broadcasting signal corresponding to the transmitted region information from the second server, and
   to display the image of the broadcasting signal based on the received channel information,
   wherein the communicator and the controller comprise at least one circuitry,
   wherein the region information comprises at least one of a nation, a local area name, longitude and latitude regarding the access point, and
   wherein the controller displays a setup image enabling a user to input information on an installation region and information on a content service provider when the communicator is not connected to an external network, and stores the information input through the setup image.

2. The display apparatus of claim 1, wherein the controller skips at least one automatically performed setup stage, which is not provided to a user during execution of an initial setup service.

3. The display apparatus of claim 1, wherein the controller executes an initial setup service when a user turns on the display apparatus for a first time.

4. The display apparatus of claim 1, wherein the communicator is connected to an external network for communication based on a wireless communication protocol, and the controller determines an installation region of the display apparatus based on the identification information of the access point connected based on the wireless communication protocol established for the communicator to be connected to the external network.

5. The display apparatus of claim 1, wherein the controller is provided with a recommended service corresponding to a deduced installation region from a content service provider to be displayed as an image on the display unit.

6. The display apparatus of claim 1, wherein the controller determines an installation region based on Wi-Fi positioning system (WPS) information, and determines a content service provider based on at least one from among a received signal strength indication (RSSI), wireless Internet service providers (WISP) and a service set identifier (SSID).

7. The display apparatus of claim 1, wherein the controller acquires and stores a channel map corresponding to an installation region of the display apparatus and skips a stage of scanning a broadcast signal to generate the channel map among setup stages.

8. The display apparatus of claim 1, wherein the second server stores data of a channel map corresponding to the region information, and the controller receives the channel map corresponding to the region information from the second server.

9. A control method of a display apparatus, the method comprising:
    connecting with an access point;
    transmitting identification information of the connected access point to a first server which stores region information corresponding to the access point;
    receiving the region information corresponding to the transmitted identification information of the access point from the first server;
    transmitting the received region information to a second server which stores channel information of a broadcasting signal;
    receiving the channel information of the broadcasting signal corresponding to the transmitted region information from the second server; and
    displaying an image of the broadcasting signal based on the received channel information,
    wherein the region information comprises at least one of a nation, a local area name, longitude and latitude regarding the access point, and
    wherein the control method further comprises displaying a setup image enabling a user to input information on an installation region and information on a content service provider when the display apparatus is not connected to an external network, and storing the information input through a setup image.

10. The control method of claim 9, further comprising skipping automatically performed setup stages without presenting at least one of setup stages to the user during execution of an initial setup service.

11. The control method of claim 9, further comprising executing an initial setup service when the user turns on the display apparatus for the first time.

12. The control method of claim 9, wherein the display apparatus is connected to an external network for communication based on a wireless communication protocol, and the control method further comprises determining an installation region of the display apparatus based on the identification information of the access point connected based on the wireless communication protocol established for the display apparatus to be connected to an external network.

13. The control method of claim 9, further comprising receiving a recommended service corresponding to a deduced installation region from a content service provider and displaying as an image.

14. The control method of claim 9, wherein an installation region of the display apparatus is determined based on Wi-Fi positioning system (WPS) information, and the control method further comprises determining a content service provider based on at least one from among a received signal strength indication (RSSI), wireless Internet service providers (WISP) and a service set identifier (SSID).

15. The control method of claim 9, wherein the receiving the channel information comprises acquiring and storing a channel map corresponding to an installation region of the display apparatus and skipping a stage of scanning a broadcast signal to generate a channel map among setup stages.

16. The control method of claim 9, wherein the second server stores data of a channel map corresponding to the region information, and the receiving the channel information comprises receiving the channel map corresponding to the region information from the second server.

17. A display apparatus comprising:
    a display unit;
    a signal processor which is configured to process a broadcasting signal to be displayed as an image on the display unit;
    a communicator which is configured to communicate via an access point with a first server which stores region information of the display apparatus and communicate with a second server which stores channel information of the broadcasting signal; and
    a controller which is configured:
    to transmit identification information of the access point to the first server,
    to receive the region information corresponding to the transmitted identification information of the access point from the first server,
    to display a popup image to allow a user to select whether the region information is correct,
    to transmit the region information to the second server in response to the user selecting that the region information is correct,
    to receive the channel information of the broadcasting signal corresponding to the transmitted region information from the second server, and
    to display the image of the broadcasting signal based on the received channel information,
    wherein the communicator and the controller comprises at least one circuitry, and
    wherein the controller displays a setup image enabling a user to input information on an installation region and information on a content service provider when the communicator is not connected to an external network, and stores the information input through the setup image.

18. The display apparatus of claim 17, wherein the controller displays one or more content service providers to be selectable, the one or more content service providers corresponding to the region information upon a condition that the user selects via the popup image that the region information is correct, and displays an image provided to allow the user to input new region information if the user selects via the popup image that the region information is not correct.

19. A control method of a display apparatus, the method comprising:
    transmitting identification information of an access point to a first server which stores region information of the display apparatus,
    receiving region information corresponding to the transmitted identification information of the access point from the first server,
    displaying a popup image to allow a user to select whether the region information is correct;
    in response to the user selecting that the region information is correct, transmitting the region information to a second server which stores channel information of a broadcasting signal;
    receiving the channel information of the broadcasting signal corresponding to the transmitted region information from the second server; and
    displaying an image of the broadcasting signal based on the received channel information,
    wherein the control method further comprises displaying a setup image enabling a user to input information on an installation region and information on a content service provider when the display apparatus is not connected to an external network, and storing the information input through a setup image.

20. The control method of claim 19, further comprising:
displaying one or more content service providers to be selectable corresponding to the region information upon a condition that the user selects via the popup image that the region information is correct; and
displaying an image to allow the user to input new region information upon a condition that the user selects via the popup image that the region information is not correct.

* * * * *